UNITED STATES PATENT OFFICE.

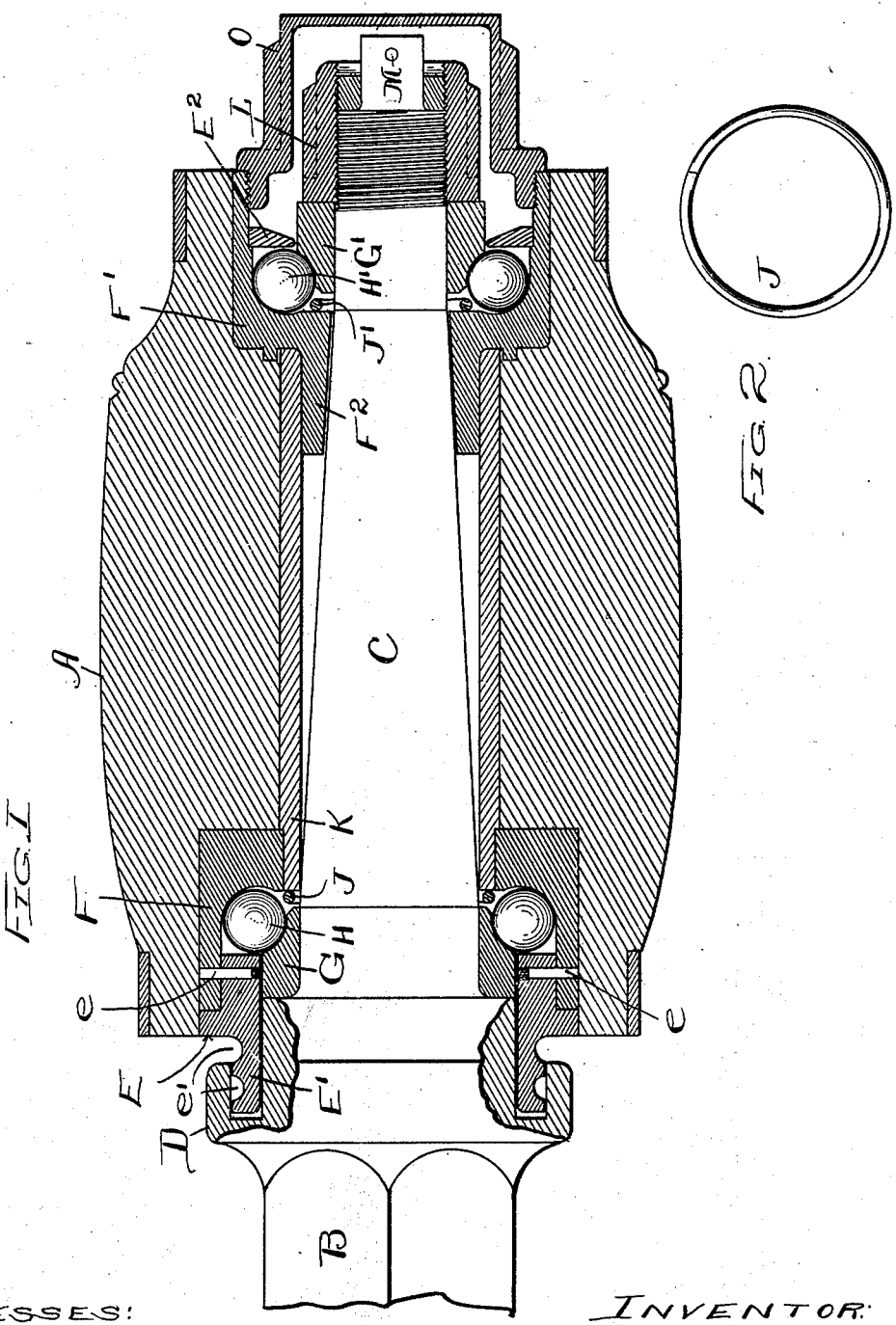

CHARLES E. ROBERTS, OF OAKPARK, ILLINOIS.

BALL-BEARING.

SPECIFICATION forming part of Letters Patent No. 698,557, dated April 29, 1902.

Application filed September 17, 1900. Serial No. 30,237. (No model.)

*To all whom it may concern:*

Be it known that I, CHARLES E. ROBERTS, a citizen of the United States, residing in Oakpark, in the county of Cook and State of Illinois, have invented a new and useful Improvement in Ball-Bearings, of which the following is a specification.

This invention relates to improvements in ball-bearings for the wheels of carriages and other vehicles.

The nature of the invention is fully disclosed in the subjoined description and also in the accompanying drawings, in which—

Figure 1 is a longitudinal section of my invention. Fig. 2 is a detail of the ring employed to confine the balls when the wheel is removed from the axle.

In said drawings, A represents the hub of the wheel, B the axle, and C the spindle upon which the wheel turns.

D is the usual enlargement at the base of the spindle and in this case is cut out on the outer side to form a groove for the reception of the reduced end of the ball-ring E, as hereinafter fully explained.

F is the cup of the inner bearing, and G is the opposing cone, these being arranged with the cup toward the longitudinal center of the hub. The ring E is non-rotatively fitted in the end of the cup, and it and the cup are both provided with registering openings adapted to receive locking-pins $e$, which are frictionally held in the openings, but cannot escape therefrom because of the presence of the hub on the outside and the cone on the inside. The balls of this bearing are shown at H, and the ring E is provided with an extension E', extending back and into the groove of the base D. Water grooves or channels $e'$ are formed in the outer surface of extension E' to assist in excluding the water from the bearing.

When the wheel is removed from the axle, the balls are rendered accessible; but I confine them in the space between the cup and ball-ring against accidental dislodgment by means of a split spring-ring J, whose normal position is that illustrated, and which is sprung into such position after the balls have been placed in said space. This ring should lie loosely in the annular opening between the cone on one side and the cup and sleeve K, hereinafter mentioned, on the other side. The ring is thus located inside the balls and between the balls and the axis of the bearing and in the inner or axial opening between the cup and cone and reduces said opening, so that the balls cannot fall out without first removing the ring. The ring is very easily taken out and inserted.

In the bearing at the outer end of the hub the cup is shown at F', the cone at G', the balls at H', the ball-ring at E', and the spring retaining-ring at J'. In this bearing, as in the other, the cup is located at the side of the balls nearest the central plane of the wheel, and the ring J' is between the cup and cone on the inner side of the balls. The cup F' is provided with an inward extension $F^2$, fitting the interior of sleeve K, while the cup F fits the exterior of the sleeve, and the ring $E^2$, unlike the ring E, is simply a flat ring secured tightly in the cup. The ring J' is loosely positioned and serves the same office in all respects with reference to the balls H' as does ring J with reference to the balls of the inner bearing.

The cone G' is confined on the spindle by the nut L and the locking-pin M, and the outer end of the spindle is protected by a dust-cap O, threaded into the outer end of the cup.

It will be noticed that the ball-rings E and $E^2$ are made fast in their respective cups without being absolutely non-detachable. Where they have been heretofore made readily detachable, as in the case of the screw-threaded ball-rings in my Patent No. 598,535, it was in order to give access to the balls; but by locating the opening for the insertion and removal of the balls between the cup and the cone and partially filling such opening with the spring-ring this necessity for detaching the rings from the cups is removed. The form of attachment here shown is to be preferred to the screw-threaded attachment, as the latter form permits changes in the adjustment, and as these changes are usually made by unskilled persons they are quite as apt to be wrong as right, while with my improved construction the adjustment is fixed once for all by the manufacturer, and no changes can occur in the position of the ball-rings relative to the other parts.

I claim—

1. The combination in a ball-bearing for axles, of the cup, the ball-ring, the cone, the balls and a loose split ring for holding the balls in the cup when the cup and cone are separated, such ring being located in the axial opening between the cup and cone, substantially as specified.

2. The combination with the balls, cone and cup of a ball-bearing of a ball-ring fast in the cup, and a loose split spring-ring for retaining the balls located inside the balls and in the axial opening between the cup and cone, substantially as specified.

CHARLES E. ROBERTS.

Witnesses:
H. M. MUNDAY,
L. E. CURTIS.